United States Patent Office 2,699,452
Patented Jan. 11, 1955

2,699,452

ETHERS OF ALPHA-GLYCERYLAMINE

Benjamin G. Wilkes, Jr., Wilkinsburg, and Arthur B. Steele, Pittsburgh, Pa., assignors to Union Carbide and Carbon Corporation, a corporation of New York No Drawing. Application July 3, 1952, Serial No. 297,156

5 Claims. (Cl. 260—584)

The present discovery relates to ethers of alpha-glycerylamine. More particularly, it is concerned with the following alpha-glycerylamine ethers of monoglycol and diglycol monomethyl ethers:

$CH_3OC_2H_4OCH_2CHOHCH_2NH_2$
Gamma-(methoxyethyl)ether of alpha-glycerylamine $CH_3OC_2H_3(CH_3)OCH_2CHOHCH_2NH_2$
Gamma-(2-methoxypropyl)ether of alpha-glycerylamine $CH_3(OC_2H_4)_2OCH_2CHOHCH_2NH_2$
Gamma-(methoxyethoxyethyl)ether of alpha-glycerylamine $CH_3[OC_2H_3(CH_3)]_2OCH_2CHOHCH_2NH_2$
Gamma-(2-methoxy-2-propoxypropyl)ether of alpha-glycerylamine These new compounds can be represented by the following general formula $CH_3(OC_2H_3R)_nOCH_2CHOHCH_2NH_2$ in which R is hydrogen or methyl and $n$ is an integer not more than 2. These alpha-glycerylamine ethers of the monoglycol and diglycol monomethyl ethers are valuable intermediates. For instance, their amide derivatives formed from the fatty acids stearic, lauric, palmitic, oleic, and the like, exhibit surface-active properties and are useful as non-ionic detergents, dispersants and emulsifying agents. In condensation reactions with the fatty acid, the lesser activity of the secondary hydroxyl group of our glycerylamine ethers favors amide formation over the competing esterification reaction which, when ethanol amines and polyglycol amines possessing primary hydroxyl groups are employed, complicates the system. The fatty acid amides of our new compounds are also more oil-soluble than those derived from polyethylene glycol amines of about the same molecular weight because of a higher amide content and lower ester content. Our glyceryl amine ethers are colorless liquids practically devoid of odor and accordingly are useful soap formers in cosmetic formulations. They are also more color-stable than the ethanolamines, which may possibly be due to the fact that oxidative degradation of the former yields stable ketone bodies while oxidation of the latter yields aldehyde structures with objectionable characteristics.

Our new glycerylamine ethers are readily prepared by the reaction of the corresponding glycidyl ether of the monoglycol and diglycol monomethyl ethers with ammonia. Referring to the gamma-(methoxyethyl) ether of alpha-glycerylamine by way of example, the reaction that takes place, starting with the glycidyl ether of ethylene glycol monomethyl ether, can be illustrated by the following equation:

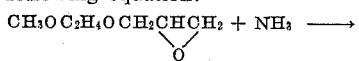

$+ NH_3 \longrightarrow$ $CH_3OC_2H_4OCH_2CHOHCH_2NH_2$

Methoxyethyl glyceryl ether + ammonia → gamma-(methoxyethyl)ether of alpha-glycerylamine Preferably, the reaction is carried out in the liquid phase with the glycidyl ether being added to the ammonia in aqueous solution. Instead of water, any other solvent for the ammonia which is non-reactive with the glycidyl ether can be used.

A reaction temperature of about 10° C. to 40° C. is preferred although a temperature above 40° C. may be employed if desired. At temperatures below 10° C. the rate of reaction is so slow as to be impracticable.

Upon the completion of the reaction, the unreacted ammonia is expelled by boiling and the water removed at an elevated temperature and reduced pressure. The product which remains is further purified by distillation.

As starting material for reaction with the ammonia, the alpha-glycerylchlorhydrin ether of the glycol monomethyl ether can be used instead of the glycidyl ether.

The invention is further illustrated by the examples which follow.

Example 1

$CH_3OCH_2CH_2OCH_2CHOHCH_2NH_2$
Gamma-(methoxyethyl)ether of alpha-glycerylamine To 800 grams (13 mols) of aqueous ammonia (28 per cent) was added 208 grams (1.57 mols) of the glycidyl ether of methoxy ethanol, forming a clear solution. Following an induction period of about five minutes, an exothermic reaction which raised the temperature of the reaction mixture 35° C. was noted. Cooling was provided to prevent a further temperature rise. After the reaction was complete, unreacted ammonia was expelled by heating to a temperature of 97° C., while the water was removed at reduced pressure through a fractionating column to a vapor temperature of 96° C. at an absolute pressure of 2 millimeters of mercury. The remainder was then fractionally distilled to yield 190 grams of gamma-(methoxyethyl)ether of alpha-glycerylamine distilling at a temperature of 96° C. to 100° C. at an absolute pressure of 2 millimeters of mercury. This product which was a colorless, slightly viscous liquid without amine odor was characterized by the following properties: Specific gravity (25°/20° C.), 1.072; equivalent weight by titration, 148.6; nitrogen by analysis, 9.1 per cent; calculated for $C_6H_{15}O_3N$, 9.3 per cent.

Example 2

$CH_3OCH_2CH_2OCH_2CHOHCH_2NH_2$
Gamma-(methoxyethyl)ether of alpha-glycerylamine A mixture of 168 grams (1 mol) of gamma-(methoxyethyl)ether of alpha-glycerylchlorhydrin and 170 grams (10 mols) of ammonia in the form of an aqueous solution (28 per cent) was heated to a temperature of 60° C. and maintained at this temperature for a period of three hours. The mixture was then cooled and 40 grams (1 mol) of sodium hydroxide added in the form of an aqueous concentrate (50 per cent). Unreacted ammonia was expelled to a temperature of 98° C., and the water removed as in Example 1. The crude product was then freed of salt by filtration and fractionally distilled. There was obtained 76 grams of gamma-(methoxyethyl)ether of alpha-glycerylamine distilling at a temperature of 89° C. to 91° C. at an absolute pressure of 1.5 millimeters of mercury. As in Example 1, this product was a colorless, slightly viscous liquid without amine odor characterized by the following properties: Specific gravity (25°/20° C.), 1.0721; equivalent weight by titration, 148.4. The yield was 51 per cent.

Example 3

$CH_3OC_2H_4OC_2H_4OCH_2CHOHCH_2NH_2$
Gamma-(methoxyethoxyethyl)ether of alpha-glycerylamine To 580 grams (9 mols) of aqueous ammonia solution (28 per cent) was added dropwise over a period of two hours 200 grams (1.13 mols) of the methoxyethoxyetheyl glycidyl ether. The reaction mixture was well agitated by stirring during the addition, and maintained at a temperature of 30° C. Thereafter, the unreacted ammonia was expelled by heating the reaction mixture to a boiling temperature of 98° C. Water was distilled off to a vapor temperature of 125° C. at a reduced pressure of 2 millimeters of mercury, absolute. The remainder was then fractionally distilled to yield 178 grams of gamma-(methoxyethoxyethyl)ether of alpha-glycerylamine which distilled at a temperature of 125° C. to 128° C. at an absolute pressure of 2 millimeters of mercury. This product was a colorless, water-soluble liquid without amine odor characterized by the following properties: Specific gravity (25°/20° C.), 1.0840; equivalent weight by titration, 194.1; nitrogen by analysis, 7.2 per cent, calculated for $C_8H_{19}O_4N$, 7.3 per cent. The yield was 80 per cent, with the remainder of the material accounted for by the formation of secondary amine.

Example 4

$CH_3OC_2H_3(CH_3)OCH_2CHOHCH_2NH_2$

Gamma-(2-methoxypropyl)ether of alpha-glycerylamine

To 800 grams (13 mols) of aqueous ammonia solution (28 per cent) was added 234 grams (1.6 mols) of 2-methoxypropyl glycidyl ether (mixed isomers) forming a clear solution. After a brief induction period, an exothermic reaction took place which raised the temperature of the reaction mixture to 36° C. A further rise in temperature was prevented by cooling. After the reaction was complete, unreacted ammonia was boiled off to a temperature of 98° C. and water then removed under reduced pressure to a temperature of 88° C. at an absolute pressure of 2 millimeters of mercury. The remainder was then fractionally distilled to yield 208 grams of gamma-(methoxypropyl)ether of alpha-glycerylamine which was a colorless, slightly viscous liquid having a mild amine odor. It was characterized by the following properties: Boiling range, 88° C. to 94° C. at an absolute pressure of 2 millimeters of mercury; specific gravity (26°/20° C.), 1.0384; index of refraction ($n_D^{24}$), 1.4541; equivalent weight by titration, 162.9; nitrogen by analysis 8.51 per cent (calculated for $C_7H_{17}O_3N$, 8.59 per cent). The yield was 80 per cent of theory, the remainder of the material being accounted for a high boiling residue, presumably secondary amines.

Example 5

$CH_3OC_2H_3(CH_3)OC_2H_3(CH_3)OCH_2CHOHCH_2NH_2$

Gamma-(2-methoxy-2-propoxypropyl)ether of alpha-glycerylamine

To 800 grams of aqueous ammonia solution (28 per cent; 13 mols) was added 326 grams (1.6 mols) of the glycidyl ether of dipropylene glycol monomethyl ether (mixed isomers). The addition was carried out dropwise over a period of two hours while the reaction mixture was maintained at a temperature of 30° C. with stirring. After the reaction was complete, unreacted ammonia was boiled off to a temperature of 97° C., and the water then removed to a vapor temperature of 116° C. at an absolute pressure of 2 millimeters of mercury. The remainder was then fractionally distilled to yield 290 grams of the alpha-glycerylamine ether of dipropylene glycol monomethy ether which was a colorless, water-soluble liquid characterized by the following properties: boiling range, 116 to 125° C. at 2 millimeters of mercury absolute; specific gravity (26°/20° C.), 1.0380; index of refraction ($n_D^{24}$), 1.4500; equivalent weight by titration, 222; nitrogen by analysis, 6.3 per cent (calculated for $C_{10}H_{23}O_4N$, 6.33 per cent).

What is claimed is:

1. $CH_3OC_2H_4OCH_2CHOHCH_2NH_2$
Gamma-(methoxyethyl)ether of alpha-glycerylamine 2. $CH_3OC_2H_3(CH_3)OCH_2CHOHCH_2NH_2$
Gamma-(2-methoxypropyl)ether of alpha-glycerylamine 3. $CH_3(OC_2H_4)_2OCH_2CHOHCH_2NH_2$
Gamma-(methoxyethoxyethyl)ether of alpha-glycerylamine 4. $CH_3[OC_2H_3(CH_3)]_2OCH_2CHOHCH_2NH_2$
Gamma-(2-methoxy-2-propoxypropyl)ether of alpha-glycerylamine 5. A compound of the formula $$CH_3(OC_2H_3R)_nOCH_2CHOHCH_2NH_2$$

in which R is of the group consisting of hydrogen and methyl and $n$ is an integer from 1 to 2.

References Cited in the file of this patent

Boyd, "Chem. Abst." (1910), vol. 4 p. 1020.
Boyd, "Chem. Abst." (1911), vol. 5, p. 78.
Schoeller et al., "Chem. Abst." (1929), vol. 23, p. 3234.